United States Patent [19]

Kutaragi

[11] Patent Number: 4,719,523
[45] Date of Patent: Jan. 12, 1988

[54] SYNCHRONIZING SIGNAL DETECTING CIRCUIT

[75] Inventor: Ken Kutaragi, Kanagawa, Japan

[73] Assignee: Sony Corporation, Tokyo, Japan

[21] Appl. No.: 857,258

[22] Filed: Apr. 30, 1986

[30] Foreign Application Priority Data

May 28, 1985 [JP] Japan .............................. 60-114692

[51] Int. Cl.$^4$ .............................................. G11B 5/09
[52] U.S. Cl. ........................................ 360/51; 360/48
[58] Field of Search .............. 360/51, 48, 40; 369/59; 375/119, 120

[56] References Cited

U.S. PATENT DOCUMENTS 4,433,348 2/1984 Stockham, Jr. ...................... 360/51

Primary Examiner—Vincent P. Canney
Attorney, Agent, or Firm—Lewis H. Eslinger; Alvin Sinderbrand

[57] ABSTRACT

A synchronizing signal detecting circuit for a digital data reproducing apparatus has a reproducing device connected to a magnetic head which scans a recording medium for deriving digital signals, a phase locked loop circuit connected to the reproducing device for generating a clock signal based on the derived digital signals, a synchronizing counter for generating synchronizing timings by counting the clock signal, a plurality of synchronizing pattern detecting circuits connected to the reproducing device for detecting synchronizing patterns included in the digital signals, and a logic circuit connected to the plurality of synchronizing pattern detecting circuits for supplying an initialize pulse to the synchronizing counter upon detecting successive synchronizing patterns in the digital signals by the plurality of synchronizing pattern detecting circuits.

10 Claims, 12 Drawing Figures

FIG. 3B (PRIOR ART) 1 TRCK

FIG. 3C (PRIOR ART) 1 SECT

FIG. 3D (PRIOR ART) 1 FRAM

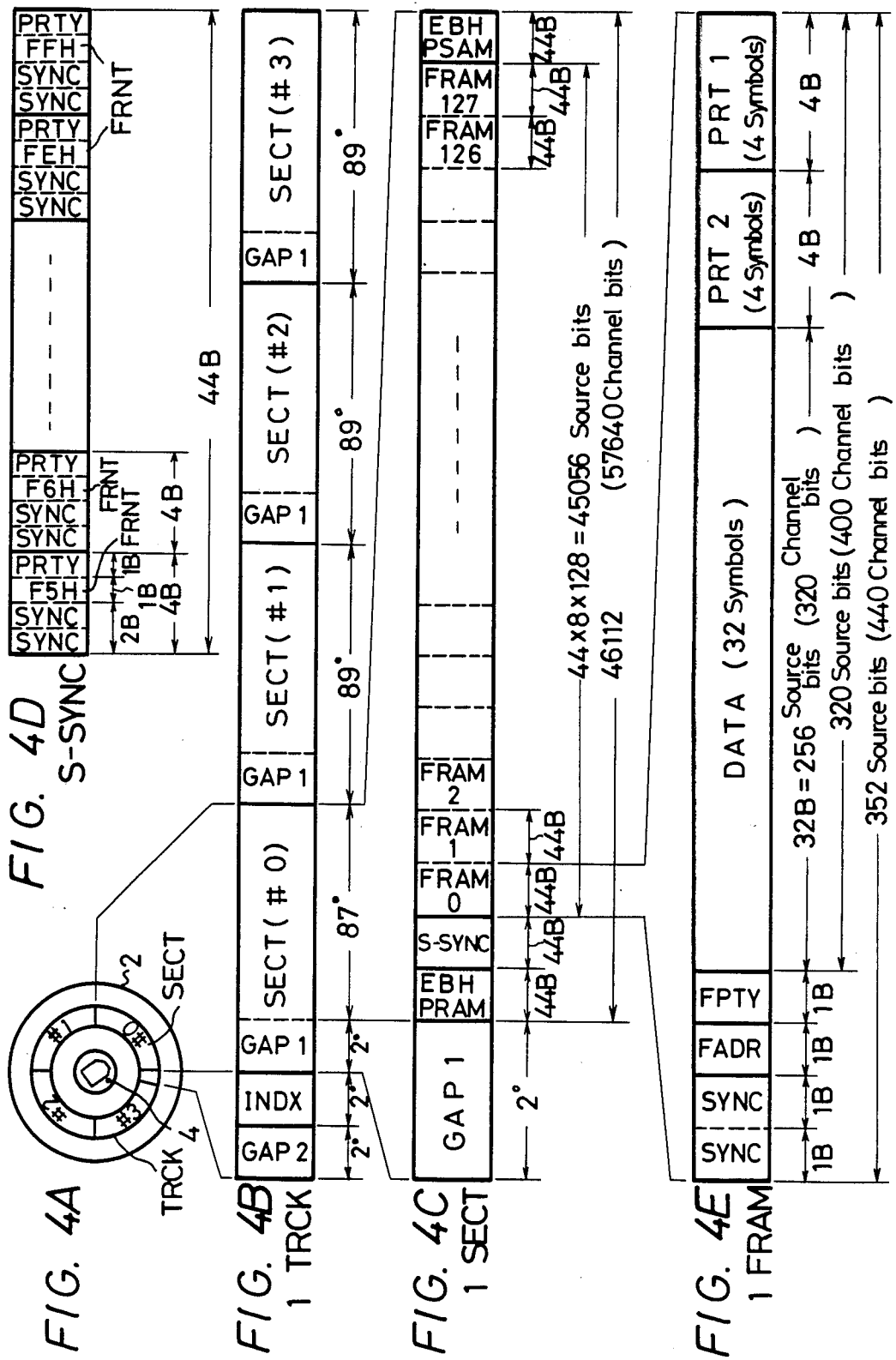

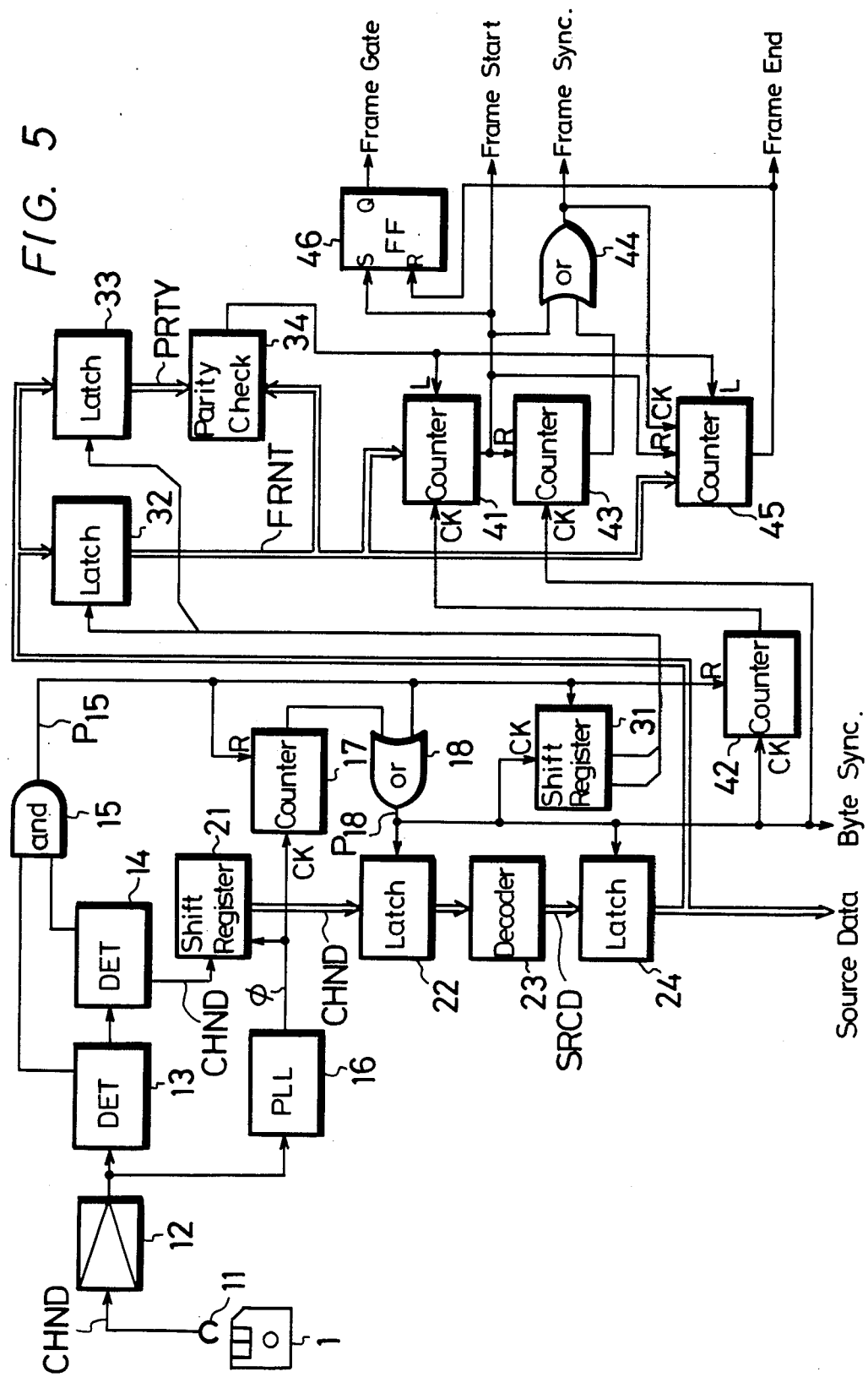

SYNCHRONIZING SIGNAL DETECTING CIRCUIT

BACKGROUND OF THE INVENTION

1. Field of the Invention

This invention relates generally to synchronizing signal detecting circuits, and more particularly is directed to a synchronizing signal detecting circuit for digital data reproduced from a magnetic disc.

2. Description of the Prior Art

A standardized small-sized floppy disc having a 2-inch diameter, and which was developed for use in recording video signals in association with an electronic still camera, has also been proposed as a recording medium for digital data.

Such standardized video floppy disc 1 is shown in FIG. 1 to include a magnetic disc. This magnetic disc 2 is 47 mm in diameter, 40 μm in thickness and is provided at its center with a core 3 engageable with a spindle of a disc drive apparatus (not shown). The center core 3 is provided with a magnetic insert 4 which is detectable to present a reference signal indicating the angular position of the magnetic disc 2 when it is rotated.

A receptacle or jacket 5, which is 60×54×3.6 mm in size, rotatably contains the magnetic disc 2. The jacket 5 includes a central opening 5A to expose therethrough the center core 3 and the magnetic insert 4 to the outside. The, jacket 5 is further provided with an access opening on window 5B, through which a magnetic head (not shown) can contact the magnetic disc 2 during recording and/or reproducing. When the video floppy disc 1 is not in use, access opening or window 5B is closed by a slidable dust-proof shutter 6. A nail member or tab 7 is provided on the jacket 5 for avoiding inadvertent or erroneous recording. This nail member 7 is removed from the jacket 5 when recording is to be inhibited.

In the recording mode, 50 concentric magnetic tracks can be formed on the magnetic disc 2 in which case, the outermost track is represented as the 1st track and the innermost track is represented as the 50th track. The width of each track is 60 μm and the width of each guard band between the tracks is 40 μm.

When taking a picture by means of the electronic still camera, the magnetic disc 2 is rotated at 3600 rpm (field frequency) and a video signal of one field is recorded in one circular track as a still picture. The color video signal to be thus recorded has the frequency distribution shown in FIG. 2. More particularly, a luminance signal Sy is shown to be frequency-modulated to an FM signal Sf, with the sync tip level of the FM signal Sf being 6 MHz and the white peak level thereof being 7.5 MHz. Further, a line sequential color signal Sc is formed of a frequency-modulated signal Sr having a carrier with a central frequency of 1.2 MHz modulated by a color difference signal R-Y and of a frequency-modulated signal Sb having a carrier with central frequency of 1.3 MHz modulated by a color difference signal B-Y. A composite signal Sa resulting from adding the frequency-modulated color signal Sc and the frequency-modulated luminance signal Sf is recorded on the magnetic disc 2.

The video floppy disc 1 shown in FIG. 1 has a proper size and characteristics to act as a recording medium for the color video signal Sa of FIG. 2. It has also been proposed that the video floppy disc 1 may be used as a recording medium for recording digital data, and FIGS. 3A to 3D illustrate previously proposed physical formats to be used when, digital data are recorded on and/or reproduced from the video floppy disc 1.

In FIGS. 3A and 3B, reference TRCK designates one of the tracks formed on the magnetic disc 2 in the digital data recording format. This track TRCK comprises a gap area or interval GAP2 of 2° angular extent, an index area or interval INDX of 2° angular extent following GAP2 in the longitudinal direction of the track TRCK and four equally-divided intervals of 89° based on the position of the magnetic insert 4 as a reference. Each of the four 89° intervals is referred to as a sector SECT. The sector SECT immediately after the magnetic insert 4 is referred to as zero-th sector (#0) and other succeeding sectors SECT are sequentially referred to as the first (#1), second (#2) and third (#3) sectors, respectively. When data are interchanged between the video floppy disc 1 and a host computer (not shown), that data are interchanged with one sector SECT as the unit. Further, the index interval INDX corresponds to about three of the frame intervals of data indicated at FRAM and which will be described later. In the example being described, a signal "1000", indicative of Tmax (maximum length between transitions) of a digital signal, is repeatedly recorded all over the index interval INDX.

As shown in FIG. 3C, the interval of 2° from the start end of each sector SECT is provided as a gap interval GAP1 that is used as a margin portion during read and write operations. The remaining portion of each sector SECT is divided equally into 131 intervals in each of which 44 channel bytes are recorded and/or reproduced. Each such channel byte is the unit of a signal formed by an eight-to-ten conversion and corresponds to one byte of source data, while it corresponds to 10 bits in the eight-to-ten conversion. The first two of the 131 equal intervals are provided as preamble sections PRAM. In the preamble sections PRAM, there is repeatedly provided a signal of "0101010101" which corresponds to, for example, 00H (H is a hexadecimal notation) of a source data and which is used for locking-in operation of a PLL (phase locked loop) circuit in the playback mode.

The 128 equal intervals following the preamble sections PRAM are referred to as frame intervals FRAM in which digital data are recorded and/or reproduced. The last one of the 131 equal intervals is used as a post-amble section PSAM which is equivalent to the preamble section PRAM.

As shown in FIG. 3D, one frame interval FRAM sequentially comprises, from its beginning, a synchronizing signal SYNC ("0100010001" or "1100010001") of one channel byte, a frame address signal FADR of one channel byte, a non-defined signal NRSV of one channel byte, a check signal FPTY of one channel byte, data DATA of 32 channel bytes and first and second redundant data PRT1 and PRT2 each of which is formed of 4 channel bytes, in the order stated. In such case, the check signal FPTY acts as parity data for the frame address signal FADR and the non-defined signal NRSV. While the data DATA are original data which are accessed by the host computer, this data DATA are interleaved within the digital data of one sector SECT. The redundant data PRT1 and PRT2 are parity data that are generated by coding digital data of one sector (32 bytes×128 frames) by the minimum distance 5 according to the Reed Solomon coding method.

Accordingly, the capacities for digital data in one sector SECT, one track TRCK and one video floppy disc 1 are as follows:
One sector : 4096 bytes (=16 bytes ×2×128 frames)
One track : 16K bytes (=4096 bytes ×4 sectors)
One floppy disc : 800K bytes (=16K bytes ×50 tracks)

When digital data are accessed on the video floppy disc 1, such accessing is carried out with one sector SECT as the unit so that the accessing of digital data on the video floppy disc 1 is effected on the basis of a unit of 4K bytes.

Further, the bit numbers of one frame FRAM and one sector SECT are as follows:
One frame : =(4+32+4+4) bytes ×8 source bits =352 source bits
One sector (except gap interval GAP1) =352 bits × (128+3 frames)=46112 source bits In practice, when the digital data are recorded on and/or reproduced from video floppy disc 1, the value DSV (digital sum value) must be made small, the value of Tmin/Tmax must be made small and the value of Tw (window margin) must be made large. In order to satisfy the foregoing requirements, all the digital signals are first subjected to the above mentioned eight-to-ten conversion using Tmax=4T and then recorded on the video floppy disc 1. Upon reproducing the digital signals, they are subjected to the reverse conversion (eight-to-ten conversion) and then subjected to the original signal processing.

Accordingly, for the data densities given above, the practical bit number on the video floppy disc 1 is multiplied by 10/8 and amounts to the following:
One frame : 440 channel bits
One sector (except gap interval GAP1) : 57640 channel bits Thus, the whole interval of one sector SECT is equivalent to 58965 channel bits (≈57640 channel bits×89°/87°). In practice, since the length of each interval is assigned from this channel bit number, as described above, the total length of each sector SECT comprised of frame intervals FRAM is slightly shorter than 87°.

Accordingly, the bit rate used when digital data (signal converted according to the eight-to-ten conversion) are accessed on the video floppy disc 1 is 14.31M bits/second (≈58965 bits×4 blocks×field frequency×360°/356°)
and one bit is equivalent to 69.9 nano-seconds (≈1/14.31 M bits).

A video signal and digital data can be recorded on the same video floppy disc 1 if they are recorded thereon with the track as a unit, that is, each track is recorded either with a video signal or digital data.

With the above described format, digital data of 800K bytes can be recorded on and/or reproduced from one side of the 2-inch size video floppy disc 1. This capacity is more than twice the normal capacity of the known 5-inch size floppy disc. Therefore, this 2-inch video floppy disc has a large capacity even though it is small in size.

Further, since the rotational speed of the magnetic disc 2 is the same as that used in the case of the video signal, the video signal and the digital data can be recorded and reproduced on the same disc. In that case, the frequency spectra of both types of signals recorded and/or reproduced from the magnetic disc 2 become similar so that they can be recorded and reproduced under similar suitable conditions, such as, the electro-magnetic transducer characteristics, head contact with the tape and the like. Furthermore, when the two types signals are recorded and/or reproduced in a mixed state, the rotational speed of the magnetic disc 2 does not have to be changed so that it is not necessary to consider the time necessary for switching the servo circuit. Hence, the two types of signals can be immediately used separately. In addition, the facts that only one rotational speed is used and that it is sufficient that the electromagnetic transducer system and the like have only one characteristic or function, are also advantageous from the standpoint of cost.

Thus, the described video floppy disc 1 has novel effects as a medium for recording and reproducing a video signal or for storing digital data, or as a medium for recording and reproducing a video signal and digital data on the same disc.

In the above mentioned example, when the source data are derived from the video floppy disc 1, taking the position of the synchronizing signal SYNC as a reference, the channel data are divided into channel data of 10 bits each and the divided channel data are decoded to the original source data according to the ten-to-eight conversion. Accordingly, if the synchronizing signal SYNC is detected erroneously at an improper position, the succeeding channel data are divided at the wrong positions, that is, a bit slip occurs so that an error occurs in the source data until the correct synchronizing signal is again detected. If the distance of the synchronizing signal SYNC relative to the source data is large, the probability that such error will occur is small. If, on the other hand, the transmission band is compressed as mentioned above, such distance is as short as one bit so that there is a large probability that error will occur. If the described error occurs frequently, the resulting errors can no longer be corrected by the first and second parity data PRT1 and PRT2.

Further, in the above mentioned eight-to-ten conversion, 84H assumes "1010001001" and 80H assumes "1010010101" in, for example, the source data and it is assumed that they are successive. If the last bit "1" of 84H is mistaken as "0", a bit slip of "X100010001" occurs and this bit slip coincides with the synchronizing pattern so that a synchronizing error occurs.

Here, the probability Pse of the synchronizing error is presented as $Pse = Pbe * Pr14 * Pr13$ where Pbe is the bare bit error rate, PR14 is the probability of 4-bit run length error in the eight-to-ten conversion and PR13 is the probability of 3-bit run length error in the eight-to-ten conversion. By way of example, if $Pbe = 10^{-4}$, $PR14 = 0.062$ and $Pr13 = 0.213$, and the probability Pse becomes:

$$Pse \approx 1.3 \times 10^{-6}$$

Accordingly, if the error correction ability of the above mentioned respective redundant bits provides a system in which $10^{-12}$ can be handled by $Pbe = 10^{-4}$, the Pse becomes considerably lower than the above value and hence this is disadvantageous.

In other words, if the probability that the synchronizing error will occur is considerably higher than the data error correction ability, the ability of the system to correct errors is overwhelmed.

OBJECTS AND SUMMARY OF THE INVENTION

Accordingly, it is an object of this invention to provide an improved synchronizing system for digital data.

Another object of this invention is to provide a synchronizing signal detecting circuit for positively recovering digital data reproduced from a floppy disc.

A further object of this invention is to provide a digital synchronizing system in which a plurality of the same synchronizing patterns are successively formed on a recording format.

A still further object of this invention is to provide a digital data synchronizing system in which, when a synchronizing signal is detected from channel data, the same synchronizing pattern is successively formed on a preamble section of a recording format.

According to an aspect of the present invention, in a digital data synchronizing system, a synchronizing pattern is formed on a preamble section of a recording format and the synchronizing pattern is selected to be different from that of the digital data. This synchronizing pattern is formed at least two times at each synchronizing timing, and a synchronizing detected signal is obtained only when the plurality of synchronizing patterns are all correct or coincide. A counter corresponding to the run length is reset by this synchronizing detected signal and the above mentioned synchronization is established by the output of this counter.

The above, and other objects, features and advantages of the present invention, will become apparent from the following detailed description of a preferred embodiment taken in conjunction with the accompanying drawings, throughout which the same reference numerals designate like elements and parts.

BRIEF DESCRIPTION OF THE DRAWINGS

FIGS. 3A to 3D are diagrams showing physical data formats recorded in tracks, sectors and frame intervals of the floppy disc of FIG. 1;

FIGS. 4A to 4E are diagrams showing novel physical data formats used in accordance with this invention; and FIG. 5 is a circuit block diagram showing an embodiment of a synchronizing signal detecting circuit according to the present invention.

DESCRIPTION OF THE PREFERRED EMBODIMENT

Before describing in detail a synchronizing signal detecting circuit according to the present invention, a new data format conforming to the invention will be described with reference to FIGS. 4A-4E.

Figure 3A:
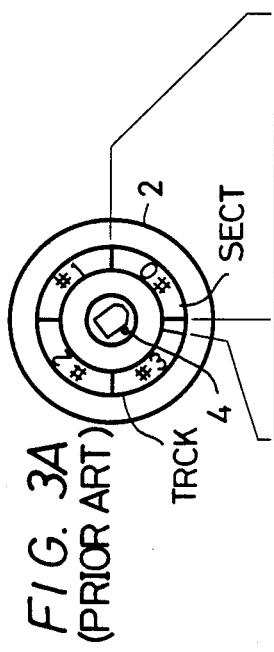

The format of each track TRCK according to this new format is similar to that in the prior art, as is apparent from a comparison of FIGS. 4A and 4B with FIGS. 3A and 3B, respectively.

As shown in FIG. 4C, in each sector SECT, the interval of 2° from the start end is assigned as the gap interval GAP1 and the remainder of each sector is divided equally by 131. The first of these 131 divided intervals is assigned as the preamble section PRAM. In this preamble section PRAM, a signal of "1111111111" corresponding to the EBH of, for example, the source data is repeatedly formed and is used for the lock-in operation of the PLL circuit upon reproducing.

Further, an interval following this preamble section PRAM is assigned as a sector synchronizing signal interval S-SYNC.

As shown in FIG. 4D, the sector, synchronizing signal interval S-SYNC is divided into 11 equal divisions or parts and 4 channel bytes are recorded on and reproduced from each of the 11 divisions or parts of sector synchronizing signal interval S-SYNC which thus contains 44 bytes. A synchronizing signal SYNC is formed repeatedly in the first two channel bytes of each of the 11 divisions. Further, in the next channel byte, there is provided a frame start position predicting signal FRNT which is incremented one by one from F5H to FFH of the source data. In the last one channel byte of each of the 11 divisions of the sector synchronizing signal interval S-SYNC, a parity signal PRTY thereof is provided.

Returning to FIG. 4C, it will be seen that 128 frames FRAM are provided in the interval following the sector synchronizing interval S-SYNC. Furthermore, the last interval of the sector is used as a post-amble section PSAM in which a signal of "1111111111" corresponding to the EBH of the source data is repeatedly provided similarly to the preamble sectional PRAM.

As shown in FIG. 4E, each frame FRAM sequentially comprises, from its start, 2-channel bytes representing the repetition of the synchronizing signals SYNC, the frame address signal FADR of one channel byte, the check signal FPTY of one channel byte, data DATA of 32 bytes, and first and second redundant data PRT1 and PRT2 of 4 bytes each. In this case, the frame address signal FADR is one channel byte and one byte on the source data. Since the number of frames FRAM within one sector SECT is 128, it is sufficient that the frame address is formed of 7 bits, while other remaining bits, for example, the MSB (most significant bit), is used to record other information. Further, the check signal FPTY is the parity data used for the frame address signal FADR, while the data DATA and the first and second redundant data PRT1 and PRT2 are similar to the corresponding data in the prior art format described with reference to FIGS. 3A-3D.

Accordingly, in the new format of FIGS. 4A-4E, the signal can be recorded and reproduced with a storage capacity exactly the same as that of the previously described prior art format.

Figure 1:
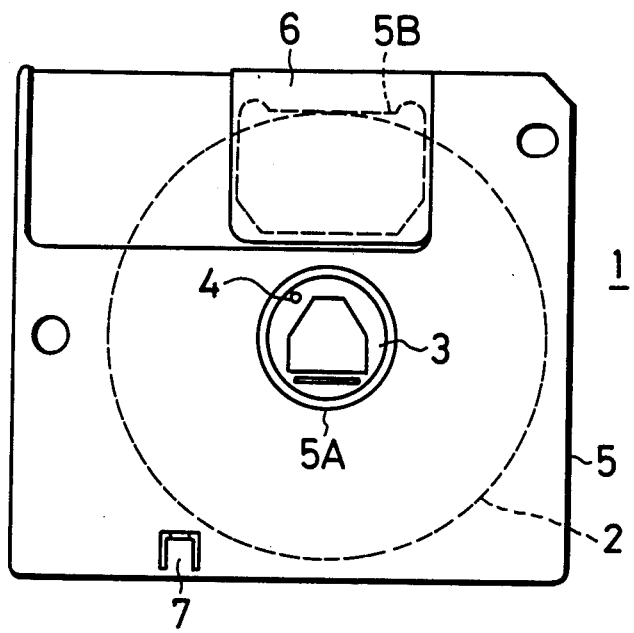
FIG. 1 is a top plan view of an example of a previously proposed video floppy disc.
Figure 2:
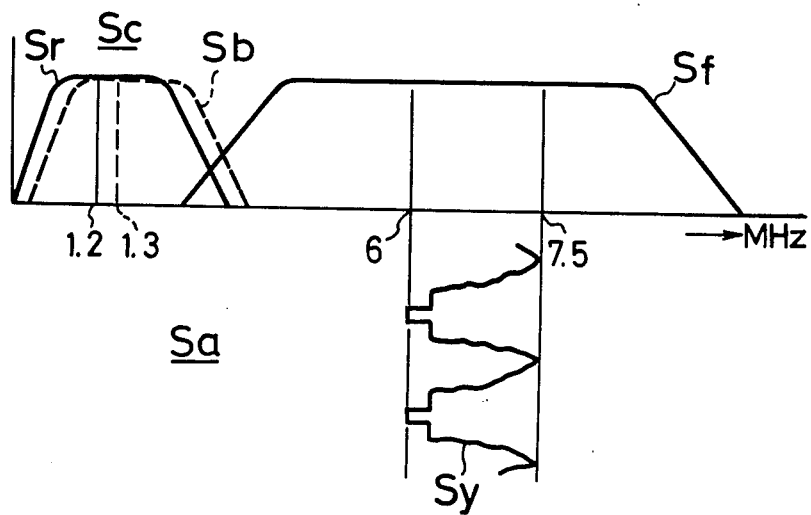
FIG. 2 is a waveform diagram showing a frequency distribution of a color video signal recorded on and/or reproduced from a magnetic disc of the video floppy disc shown in FIG. 1.

The circuit arrangement of one embodiment of a synchronizing signal detecting circuit according to the present invention will now be described with reference to FIG. 5, in which a video floppy disc 1 has magnetic disc 2 (FIG. 1) to be rotated by a motor (not shown) at the rotational speed of 60 times per second and a magnetic head 11 is made to contact a target or selected track TRCK on the magnetic disc 2 reproducing channel data CHND recorded in such target track TRCK. This data CHND are supplied through a playback amplifier 12 to a first synchronizing pattern detecting circuit 13.

Detecting circuit 13 may be formed of a shift register which has a 10-bit serial-input and serial and/or parallel outputs and a coincidence detecting circuit which compares the parallel output from this shift register with a pattern of a normal synchronizing signal SYNC and which generates an output of "1" when both of them coincide with each other. Accordingly, when the synchronizing signal SYNC is reproduced correctly, an output of detecting circuit 13 becomes "1".

Such detected output from detecting circuit 13 is supplied to one input of an AND circuit 15 and also the serial output from the shift register of detecting circuit 13 is supplied to a second synchronizing pattern detecting circuit 14 and the resulting detected output from the latter is supplied to another input of AND circuit 15. Accordingly, when the two synchronizing signals SYNC at the start of a frame interval FRAM are correctly reproduced in succession, an output P15 of AND circuit 15 becomes "1".

Further, data CHND from amplifier 12 are supplied to a PLL (phase locked loop) circuit 16 which generates a channel clock $\phi$ that is bit-synchronized with data CHND. This channel clock $\phi$ is supplied to a 10-bit counter 17 as a count input and AND output P15 from AND counter 15 is supplied to counter 17 as a reset signal therefor. Then, the carry output of counter 17 and AND output P15 are delivered to respective inputs of an OR circuit 18.

The carry output of counter 17 is generated at every 10 bits of channel clock $\phi$ and at that time, counter 17 is reset by AND output P15 each time when the two synchronizing signals SYNC are correctly reproduced in succession. Further, upon its reset, counter 17 is started to count from the time of the reset that the OR circuit 18 generate its OR output P18 at every 10 bits of the channel clock counted from the synchronizing signal SYNC. In other words, OR output P18 is a synchronizing signal indicative of divisions between 10 bit sections of the channel data CHND. In this case, the 10 bits of the channel data CHND correspond to 8 bits of the source data, so that the OR output P18 is also indicative of divisions between 8 sections of the source data. Thus, OR output P18 is, and will hereinafter be referred to as, a byte synchronizing signal.

The channel data CHND are serially derived from a predetermined stage of a shift register in detecting circuit 14. This data CHND is supplied from detecting circuit 14 to a 10-bit serial-input and parallel-output shift register 21 and the clock is supplied to shift register 21 so that 10 bits each of the data CHND are parallely generated from the shift register 21. This data CHND from shift register 21 are supplied to a latch circuit 22 which is enabled by the byte synchronizing signal P18 from OR circuit 18. Thus, when the data CHND are correctly divided into 10 bits each, the data CHND are latched in latch circuit 22, and the data CHND thus latched are supplied to a decoder 23 in which they are decoded (eight-to-ten conversion) to source data SRCD of 8 bits. This converted source data SRCD are once latched in a latch circuit 24 by the byte synchronizing signal P18 and then derived therefrom as a read output.

Further, the pulse P15 from AND circuit 15 is supplied to a 4-bit serial-input and parallel-output shift register 31 and the byte synchronizing signal P18 is supplied to shift register 31 as a clock so that outputs are generated from first and second bits or stages of shift register 31 at times of signals FRNT and PRTY, respectively. These outputs from the first and second bits of shift register 31 are supplied to 8-bit latch circuits 32 and 33 as latch enable inputs therefor, and the source data SRCD from latch circuit 24 are supplied to latch circuits 32 and 33 so that signals FRNT and PRTY (and any signals generated at the times of these signals FRNT and PRTY) are latched in latch circuits 32 and 33, respectively. These latched signals FRNT and PRTY are supplied from latch circuits 32 and 33, respectively, to a parity check circuit 34 in which the signal FRNT is checked by the parity signal PRTY. When the signal FRNT is correct, the checked output from parity check circuit 34 is supplied to an 8-bit counter 41 as a load signal. Further, the signal FRNT from latch circuit 32 is supplied to counter 41 as a preset input which is loaded into counter 41 in response to the load signal from parity check circuit 34.

The byte synchronizing signal P18 is also supplied to a quaternary counter 42 as a count input and the signal P15 is supplied to counter 42 as a reset input so that a carry output is generated by counter 42 at every 4 cycles of the byte synchronizing signal P18. In other words, counter 42 produces a signal having the cycle of signal FRNT, and such signal from counter 42 is supplied to counter 41 as the count input for the latter.

Accordingly, when any one of the signals FRNT is correct, counter 41 is preset to the value (F5H to FFH) at that time. Thereafter, counter 41 is incremented at every 4 cycles of byte synchronizing signal P18. Therefore, at the first frame FRAM following the signal S-SYNC, the carry output is generated from the counter 41, from which it follows that this carry output is a frame start signal which indicates the first frame FRAM in a particular sector SECT.

This frame start signal is supplied to a 44-scale counter 43 as a reset input and the byte synchronizing signal P18 is supplied to counter 43 as a count input so that a carry output is generated from counter 43 at every frame FRAM. Such carry output from counter 43 and the carry output from counter 41 are delivered through an OR circuit 44. Accordingly, an output is provided from OR circuit 44 in each sector SECT at every frame FRAM and become the frame synchronizing signal which indicates each frame FRAM.

Further, there is provided a 128-scale counter 45 to which there are supplied signal FRNT from latch circuit 32 as a preset input, the output of check circuit 34 as a loading signal for causing counter 45 to be loaded with its preset input, the frame synchronizing signal from OR circuit 44 as a count input and the frame start signal from counter 41 as a reset input. Accordingly, the counted value of counter 45 is made "0" by the signal FRNT or the frame start signal at the first frame FRAM of each sector SECT and, thereafter, it is incremented by "1" at each of the frames FRAM by the frame synchronizing signal so that the carry output of counter 45 is generated at the completion of 128 frames FRAM in each sector SECT. Therefore, a carry output is provided from counter 45 as the frame end signal.

The frame start signal and the frame end signal are supplied, as set and reset signals, respectively, to an RS-flip-flop circuit 46 which generates a frame gate signal indicative of the period of 128 frames FRAM in each sector SECT, and during which the source data SRCD is read out. In the described embodiment of this invention, when the frame start position announcing signal FRNT is generated at the preamble section PRAM at the beginning of each sector SECT, the frame synchronizing signal is generated on the basis of this signal FRNT so that even if the first synchronizing signal SYNC of the frame FRAM is not generated, it is possible to correctly derive this synchronizing signal from the first frame FRAM.

Further, since 11 frame start position predicting signals FRNT are successively provided at the beginning of each sector SECT, even if an error exists in a part of the frame start position predicting signals FRNT, it is possible to correctly derive the frame synchronizing signal. Moreover, even if all the frame start position predicting signals FRNT can not be obtained, it is possible to correctly obtain the frame synchronizing signal by the first synchronizing signal SYNC of the frame FRAM.

Further, when the synchronizing signal SYNC is generated at the first preamble section PRAM of a sector SECT, the byte synchronizing signal P18 is generated in synchronism with this synchronizing signal SYNC at every 10 bits of the channel data CHND, so that, even if the first synchronizing signal SYNC of the frame FRAM is not generated, it is possible to prevent erroneous generation of byte synchronizing signal P18. Furthermore, since the two synchronizing signals SYNC are repeatedly provided 11 times in succession at the beginning of each sector SECT, even if an error occurs in a part of the synchronizing signals SYNC, the byte synchronizing signal P18 can be generated. Even if an error occurs in all of the 11 synchronizing signals SYNC, it is possible to obtain the byte synchronizing signal P18 from the first synchronizing signal SYNC of the frame FRAM. In addition, since the synchronizing signal SYNC in the preamble section PRAM is utilized, it is possible to carry out the original data processing rapidly from the start position of the effective data.

In the above-described example, the source data SRCD is subjected to the eight-to-ten conversion and then recorded on the video floppy disc 1. However, if the run length of data is limited, that data is subjected to an m-n conversion (m<n) and a bit synchronizing signal and an n-bit synchronizing signal are sequentially provided in the first preamble section of a packet of that data, the present invention can be similarly applied thereto.

Further, instead of incrementing the frame start position predicting signal FRNT from F5H to FFH, that signal FRNT may be decremented from 0AH to 00H, and in that case, it is sufficient that the counter 431 carries out the down counting to thereby generate a borrow output. Alternatively, it may be possible to detect a specific counter value and to use that detected value as the frame start signal.

Although a single preferred embodiment of the invention has been described in detail with reference to the accompanying drawings, it will be apparent that the invention is not limited to that precise embodiment, and that many modifications and variations could be effected therein by one skilled in the art without departing from the spirit or scope of the invention as defined by the appended claims.

What is claimed is:

1. A synchronizing signal detecting circuit for digital data reproducing apparatus comprising: reproducing means for deriving digital signals from a storage medium; phase locked loop means connected to said reproducing means for generating clock signals based on said derived digital signals; synchronizing counter means for generating synchronizing timings by counting said clock signals; a plurality of synchronizing pattern detecting means connected to said reproducing means for detecting synchronizing patterns included in said digital signals; and logic circuit means connected to said plurality of synchronizing pattern detecting means for supplying an initialize pulse to said synchronizing counter means upon detecting successive synchronizing patterns in said digital signals at said plurality of synchronizing pattern detecting means.

2. A synchronizing signal detecting circuit as in claim 1; wherein said plurality of synchronizing pattern detecting means includes at least a series-connected first pattern detector and a second pattern detector, and pattern coincidence outputs are supplied from said first and second pattern detectors to said logic circuit means.

3. A synchronizing signal detecting circuit as in claim 2; wherein said logic circuit means includes an AND gate, and said synchronizing counter means includes a reset terminal to which an output of said AND gate is connected.

4. A synchronizing signal detecting circuit as in claim 1; wherein said digital signals include n-bit channel data converted from m-bit source data, where n and m are integers and n is larger than m.

5. A synchronizing signal detecting circuit as in claim 4; wherein said digital signals derived from said reproducing means are converted from said n-bit channel data to said m-bit source data based on said synchronizing timings derived from said synchronizing counter means.

6. A synchronizing signal detecting circuit as in claim 5; wherein said m-bit source data includes a sector synchronizing interval having a plurality of sector synchronizing sections, each of which includes number data changing successively.

7. A synchronizing signal detecting circuit as in claim 6; further comprising number data counter means which is loaded with said number data of the sector synchronizing sections when the number data are correct.

8. A synchronizing signal detecting circuit as in claim 7; wherein said number data counter means is supplied with a clock signal derived from said synchronizing timings, and supplies a frame start signal.

9. A synchronizing signal detecting circuit as in claim 1; wherein said digital signals substantially comprise a plurality of sectors, and each sector includes a preamble section, a plurality of frames and post-amble section.

10. A synchronizing signal detecting circuit as in claim 9; wherein said successive synchronizing patterns included in said digital signals are positioned at said preamble section included in each of said sectors.

* * * * *